OPTICAL SCANNING APPARATUS EMPLOYING TWO FOCUSING ELEMENTS MOVING PARALLEL TO A DIFFUSELY REFLECTING SURFACE AND WITH A SPACING PARALLEL TO A SPACING BETWEEN A LIGHT SOURCE AND A DETECTOR OR VIRTUAL IMAGE THEREOF

Filed May 23, 1966

INVENTORS D. W. HAGELBARGER
D. R. HERRIOTT
BY Wilford L. Wisner
ATTORNEY

United States Patent Office 3,461,298

Patented Aug. 12, 1969

3,461,298

OPTICAL SCANNING APPARATUS EMPLOYING TWO FOCUSING ELEMENTS MOVING PARALLEL TO A DIFFUSELY REFLECTING SURFACE AND WITH A SPACING PARALLEL TO A SPACING BETWEEN A LIGHT SOURCE AND A DETECTOR OR VIRTUAL IMAGE THEREOF

David W. Hagelbarger and Donald R. Herriott, Morris Township, Morris County, N.J., assignors to Bell Telephone Laboratories, Incorporated, Murray Hill, N.J., a corporation of New York Filed May 23, 1966, Ser. No. 552,256

Int. Cl. G01n *21/30;* G11b *7/08*

U.S. Cl. 250—219 4 Claims

ABSTRACT OF THE DISCLOSURE

An optical scanning apparatus is disclosed in which two focusing elements move parallel to a diffusely reflecting surface and with a spacing parallel to a spacing between a light source and a detector or virtual image thereof in order to track images of the light source and the detector across the surface. The scanning motion is advantageous for scanning of paper tape or similar surfaces bearing typed information or the like. The motion is achieved by a double cantilever member arrangement providing rectilinear motion parallel to a planar surface or by an arrangement providing curved motion parallel to a cylindrically curved diffusely reflecting surface being scanned.

This invention relates to optical scanning apparatus of the type employing motion of the scanning elements.

A great variety of such scanning apparatuses is known. Some employ diffuse general illumination of the surface to be scanned. Since this arrangement does not selectively illuminate the spot being scanned, it provides a relatively inefficient utilization of the illumination. Other such apparatus employ motion of a plurality of elements such that one directs illumination selective to a spot on the surface, from which another scanning element redirects a portion of the illumination reflected from the spot to an output circuit, i.e., photodetector. This arrangement can be called the tracking type of apparatus, since two or more elements are directing illumination to, or receiving illumination from, spots that track each other across the scanned surface. In the case just described, the spots coincide. The scanning elements in the tracking arrangements typically are all flat mirrors. In order to provide effective scanning, such scanning elements must be moved in a path, typically curved, which is not coplanar with their surfaces. Any necessary focusing of the illumination has been provided by fixed focusing elements.

We have recognized that the latter arrangements provide many restrictions which are undesirable for some applications. For example, scanning can be accomplished only in one coordinate dimension, since the elements do not cooperatively scan if moved parallel to their surfaces.

An object of our invention is to free a tracking type optical scanning apparatus from restriction on the common direction of the scanning elements for effective scanning.

According to our invention, the foregoing object is achieved by making the plurality of scanning elements to be focusing elements relatively disposed to provide like magnifications from respective illumination sources or photodetectors to the corresponding tracking spots on the scanned surface. In a preferred embodiment, the tracking spots are the respective images of a source and a photodetector; and they are superimposed on the scanned surface, resulting in a higher contrast signal than would be obtained with a system using general illumination.

As used herein, the term focusing element is used as a generic term for elements providing either focusing or defocusing. Such elements are commonly called optical power elements by those skilled in optics.

One specific embodiment of the invention is employed to scan paper tapes upon which information is typed, the typed characters being diffusely reflecting. Typically, the scan in this case is transverse to the tape, which is periodically advanced. The motion of the scanning elements is also constantly parallel to the planar surface of the tape and maintains the alignment of cooperating scanning elements constantly parallel to their initial alignment. Advantageously, the illumination sources and the photodetectors are mounted in fixed positions with respect to the path of the tape.

Another specific embodiment of the invention is employed to provide a two-dimensional scan of a fixed sheet of material upon which diffusely reflecting characters are stored. Advantageously, in this arrangement the scan is accomplished by a screw type advance of the scanning elements. That is, the movement of the scanning elements is translational in one dimension, passing through the axes of both elements, and rotational in the other.

Moreover, it is in accord with the principles of the present invention that the scan may involve purely translational movement of the scanning elements in two different dimensions.

Further features and advantages of the present invention will become apparent from the following detailed description taken in conjunction with the drawing in which.

Figures 1, 2:
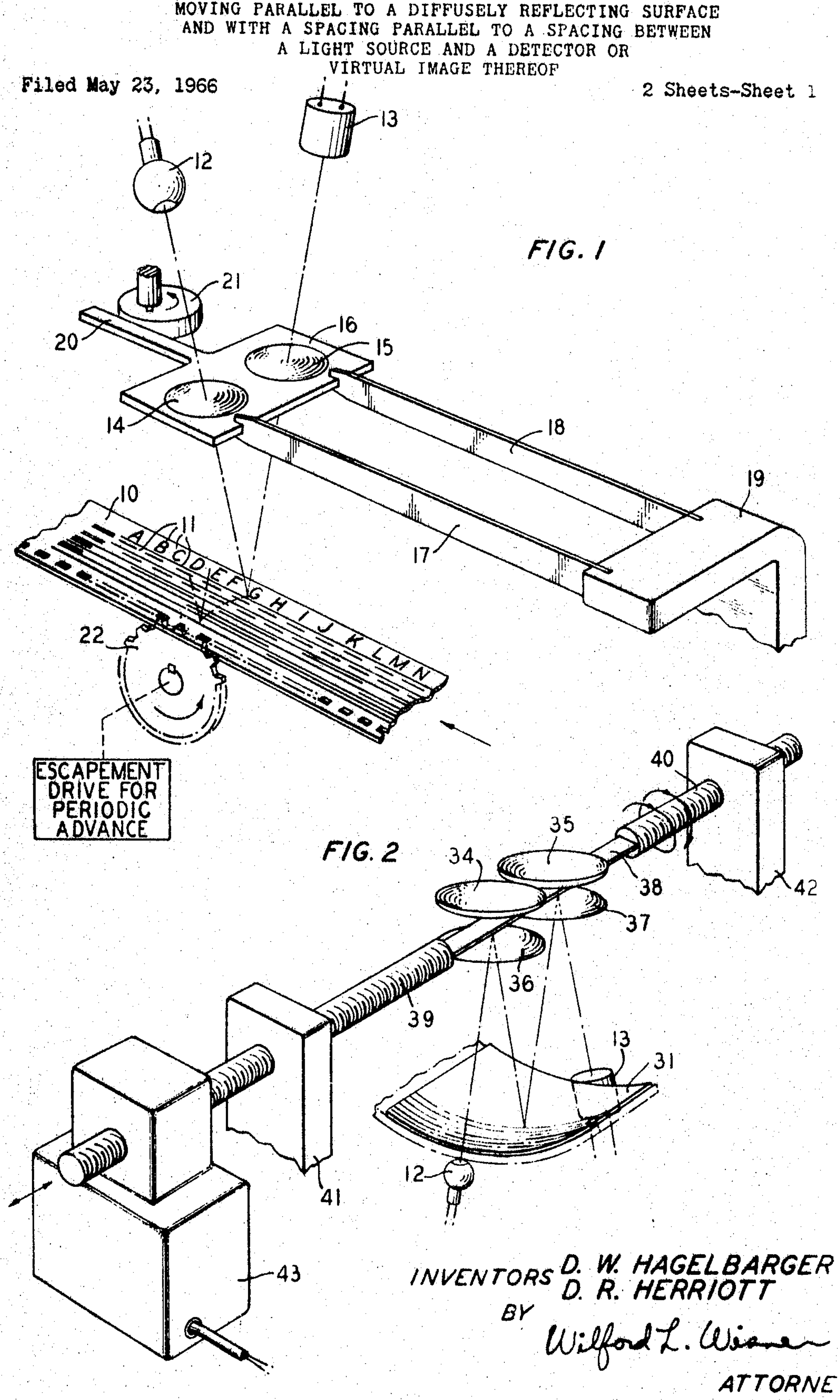
FIG. 1 is a perspective view of preferred embodiment of the invention employed for scanning a paper tape upon which information is typed.
FIG. 2 is a perspective view of another preferred embodiment of the invention employed for two-dimensional scanning of a fixed interior cylindrical surface.

In FIG. 1 a scanning apparatus according to the present invention is employed to scan a paper type 10, typically of the kind produced by the print-out from some digital computers. Information is stored upon the tape 10 in the form of diffusely reflecting characters 11, such as are produced by a typewriter. The optical scanning operation permits the information to be utilized at a time later and at a rate different from the print-out from the digital computer.

The illumination for the optical scanning apparatus is provided by an ordinary light source 12; and it is desired to obtain a time-varying signal at the output of photodetector 13. Since the signal is sequentially responsive to the various characters encountered in successive transverse scans of the paper tape 10, the scanning is described as of the sequential type. The paper tape 10 is periodically advanced longitudinally, as indicated by the arrow, by a ratchet mechanism 22 engaging suitable holes in tape 10. The ratchet mechanism 22 is driven through an escapement 23.

The scanning element 14 and 15 are converging lenses mounted in a mounting frame 16 with a spacing appropriate to superimpose the images of light source 12 and photodetector 13 upon a common spot on the tape 10.

The focal lengths of lenses 14 and 15 are equal and provide equal magnifications from source 12 and photodetector 13 to the common spot on tape 10. The flexible members 17 and 18 are anchored at laterally separated positions to the mounting post 19, which is fixed in position with respect to the path of paper tape 10. The members 17 and 18 are also attached to the mounting frame 16 at laterally separated positions and are shaped and adapted to flex in a plane substantially parallel to the plane of tape 10 and to maintain substantial rigidity with respect to stresses applied to them perpendicular to that plane. The members 17 and 18 thereby cantilever the mounting frame 16 and lenses 14 and 15 from the mounting post 19.

To obtain scanning of the paper tape 10 the mounting frame 16 is driven through a follower arm 20 integral with frame 16 by an eccentric cam 21, which in turn is rotated by a prime mover (not shown). The shape of cam 21 with respect to its eccentric center of rotation is adapted to translate the mounting frame 16 and the lenses 14 and 15 at substantially constant velocity in a direction transverse to tape 10. Preferably, the cam 21 may have a circular cross section and the amount of offset, or eccentricity, between the center of rotation and the center of the circle is related to the length of the scanning path in a manner to be described hereinafter.

In operation, the cam 21 is rotating at constant angular velocity and the tape 10 is advanced by one ratchet notch for each complete rotation of cam 21; advance occurs relatively quickly with respect to the rotation of cam 21 so that the tape may dwell in a fixed position throughout substantially all of each scan. The output of photodetector 13 is blanked during the return portion of each scan.

The following relationships pertain between the components of the system in order to provide like magnifications from source 12 and photodetecor 13 to the corresponding images at the common spot on tape 10. First $$\frac{1}{p}+\frac{1}{q}=\frac{1}{f} \qquad (1)$$

where $f$ is the focal length of each of the lenses 14 and 15, $p$ is the normal distance between either of source 12 or photodetector 13 and the plane defined by the centers of lenses 14 and 15 and the mounting frame 16, and $q$ is the distance between the latter plane and the plane in which the paper tape 10 lies. It may be seen that this relationship constrains source 12 and photodetector 13 to lie in a plane substantially parallel to that of tape 10 and also constrains the lenses 14 and 15 to lie in another plane substantially parallel to the paper tape 10.

In order that the images of source 12 and photodetector 13 may be superimposed upon the paper tape 10, the spacing D betwen the centers of lenses 14 and 15 is related to the spacing $d$ between source 12 and photodetector 13 according to the following relationship; where $$\frac{D}{d}=\frac{q}{p+q} \qquad (2)$$

The distance $s$ of the lateral movement of lenses 14 and 15 is related to the distance S of the scan at the surface of tape 10 according to the following relationship:

$$\frac{s}{S}=\frac{q}{p+q} \qquad (3)$$

The ratio of twice the eccentricity of cam 21 to the lateral movement of lenses 14 and 15 is equal to the ratio of its lever arm with respect to mounting post 19 to the lever arm of lenses 14 and 15 and with respect to post 19.

As the lenses 14 and 15 move a distance $s$, the images of source 12 and photodetector 13 move a distance S on tape 10 and remain superimposed. Excellent resolution results from the passage of the illumination through both lenses 14 and 15 from source 12 to photodetector 13. Advantageously, the line through the centers of lenses 14 and 15 remains parallel to its original position and parallel to a line between source 12 and photodetector 13 as a result of the dual support by members 17 and 18. The scan of tape 10 occurs in an arc of circle of radius equal to the distance to mounting post 19.

It is to be noted that purely translational motion of two cooperating scanning elements is believed to be unique to the present invention.

While the concept of tracking the images of a source and a photodetector across a scanned surface is known, it is the characteristic advantage of the present invention that the movement of the scanning elements 14 and 15 is permitted to be in any direction in a surface or surfaces parallel to the plane of tape 10. It is this adaptability of the present invention which permits the unusual motion employed in the arrangement of FIG. 1, that is, motion parallel to a line between light source and photodetector. As a result, the employment of focusing elements 14 and 15 as the scanning elements makes possible the unusually simple and effective apparatus shown in FIG. 1.

It will now be shown, with reference to FIG. 2, that the motion of the scanning elements within a surface substantially parallel to the scanned surface is unrestricted, unlike the tracking type of scanning accomplished with flat mirrors according to prior art techniques.

In FIG. 2 the surface to be scanned is a sheet 31 upon which information is recorded in the form of diflusely reflecting characters, and light source 12 and photodetector 13 are located near opposite edges of the sheet 31. The light source 12 and photodetector 13 lie in a surface coincident with or substantially parallel to the scanned surface of sheet 31 and are aligned with the axis of the cylindrical surface defined by sheet 31. The scanning elements 34, 35, 36 and 37 are mounted upon a thin metallic strip 38, the central long dimension of which is aligned with the common axis of the threaded members 39 and 40. This axis is also parallel to a line drawn between the centers of the active portions of light source 12 and photodetectors 13. Further, the axis of the threaded 39 and 40 is preferably coincident with the axis of the cylinder defined by the curvature of the sheet 31. The threaded members 39 and 40 are supported in matching internally threaded portions of the fixed supports 41 and 42 and are driven to advance along a common axis by the prime mover 43, which may comprise an electric motor driving a worm gear which engages the threaded member 39. The operation of the embodiment of FIG. 2 may be understood by considering the various aspects of its scanning action as follows.

The scanning elements 34 through 37 are focusing mirrors all having equal focal lengths satisfying the relationship set out in Equation 1 above where the distances $p$ and $q$ are still defined the same as for Equation 1 above. Thus, for this purpose it will be seen that pairs of the focusing mirrors, i.e., 36 and 37, are equivalent to the converging lenses 14 and 15 of FIG. 1 and provide the collateral advantage of more compact, folded optics. Equations 2 and 3 above are also applicable to the present invention, where the movement $s$ of the scanning elements is understood to be movement in the direction of the axis of the threaded members 39 and 40, i.e., movement parallel to a line between source 12 and photodetector 13, and the length of the scanned path S on the surface 31 is understood to be the length of the scanned path parallel to a line between source 12 and photodetector 13.

The employment of two pairs of scanning elements enables a more rapid repetition of the scan along the curved dimension of sheet 31, that is, perpendicular to a line between source 12 and photodetector 13. In principle, other pairs of scanning elements could be disposed about the central axis of the strip 38 but would tend to introduce some undesirable aberrations resulting from the fact that the centers of the focusing mirrors would have to be displaced from that common axis.

The scans in both of the relevant coordinates of sheet 31 have in common the characteristics that light from source 12 is efficiently focused upon a desired spot of the sheet 31, from which light is diffusely reflected or scattered by whatever character is present at that location. A portion of the diffusely reflected light is then collected by the scanning element 36 or 34 and directed upon the photodetector 13. For both directions of scan, the relationship is maintained that the image of the source 12 tracks the image of the photodetector 13 upon the surface of sheet 31. Moreover, in all positions of the scanning elements, the elements of each pair, i.e., 36 and 37 provide equal magnitification from source 12 and photodetector 13 to their corresponding images on surface 31.

Figure 3A:
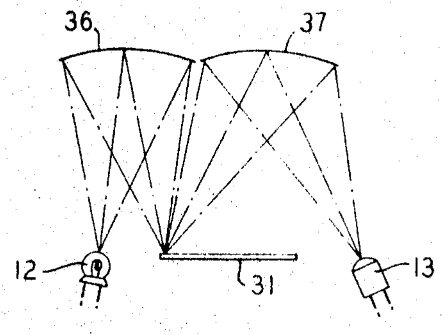
FIGS. 3A through 3C are partially pictorial front elevations and partially schematic illustrations of a modified embodiment of the invention in which successive positions of the scanning elements are shown.
Figure 3B:
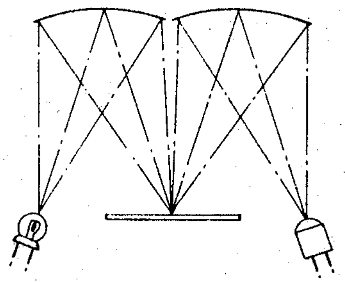
Figure 3C:
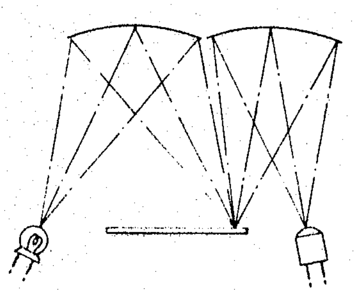

The nature of the scan along a line parallel to the line between source 12 and photodetector 13 is illustrated in FIGS. 3A, 3B, and 3C. Specular reflection occurs at the mirrors; and diffuse reflection occurs at the scanned surface. As the angles of incidence at one focusing element increase, the angles of incidence at the other decrease, and tracking is maintained. The same principles are applicable to the embodiment of FIG. 1.

Various modifications of the embodiments of FIGS. 1 and 2 can be made which still employ the principles of the present invention. For example, the scanning elements do not have to move within a common surface, but rather can move within different parallel surfaces if they are provided with appropriately differing focal lengths. Moreover, the source 12 and photodetector 13 do not have to lie in a common surface parallel to the scanned surface if one of the copending scanning elements is a lens while the other is a mirror, as illustrated in FIG. 4.

Figure 4:
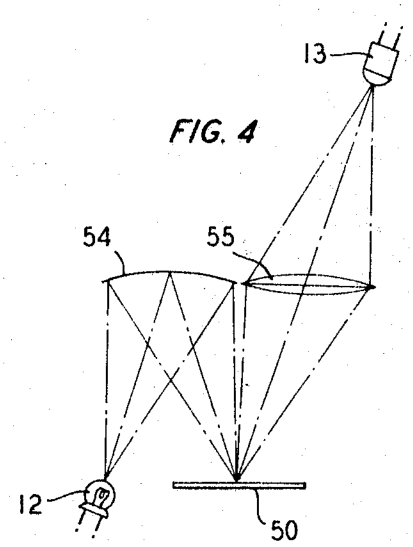
FIG. 4 is a partially pictorial front elevation and partially schematic illustration of a modified embodiment of the invention.

In the modified embodiment of FIG. 4, a virtual image of source 12 through mirror 54 would lie in a surface also including photodetector 13, which surface is substantially parallel to the scanned surface 50. Considered in that way, the embodiment of FIG. 4 is entirely equivalent to the embodiment of FIG. 1; and the principles of operation are the same. The scanned surface 50 may be the same as tape 10 of FIG. 1.

Another possible modification of the embodiments of FIGS. 1 and 2 involves the translation of a pair of scanning elements in both of the coordinate dimensions to be scanned. Such an embodiment is not illustrated herein because of the generally more complex mechanical structure for supporting and translating the focusing elements in such an embodiment. Nevertheless, the employment of focusing elements as the scanning elements according to the present invention enables such purely translational movement of the scanning elements in two coordinate dimensions to provide effective scanning in both of the dimensions.

Still another modification of the embodiments of FIGS. 1 and 2 would involve the employment of general illumination of the scanned surface independently of the focusing elements, the replacement of source 12 with another photodetector like photodetector 13 and the further separation of the focusing elements to enable them to scan spots having a constant separation, rather than coincident spots. Such an embodiment would be useful in scanning the tape on a so-called "word-organized" basis.

In all cases, the above-described arrangements are illustrative of a small number of the many possible specific embodiments that can represent applications of the principles of the invention. Numerous and varied other arrangements can readily be devised in accordance with these principles by those skilled in the art without departing from the spirit and scope of the invention.

What is claimed is:

1. An optical scanning apparatus of the type adapted for scanning a diffusely reflecting surface and comprising a plurality of sources or photodetectors, which sources or detectors or the virtual images thereof are disposed in a first common surface substantially parallel the scanned surface with a first spacing $d$ between two of said sources or photodetectors or virtual images, and further comprising a pair of scanning elements disposed in a second common surface substantially parallel the diffusely reflecting surface with a second spacing D between the axes of said pair of elements, said second spacing being in a direction parallel to that of the first spacing, the ratio of D to $d$ being equal to the ratio of the normal distance $q$ of the diffusely reflecting surface from the second common surface to the sum of $q$ and the normal distance $p$ from the first common surface to the second common surface in order to superimpose the images of two of said sources or photodetectors upon said diffusely reflecting surface, and including means for moving said scanning elements such that the second spacing remains parallel with the first spacing to track images of said two sources of photodetectors superimposed across the diffusely reflecting surface.

2. An optical scanning apparatus of the type claimed in claim 1 in which the means for moving the scanning elements comprises a screw-threaded member upon which said scanning elements are mounted, and means for advancing said screw-threaded member in a direction parallel to the directions of the first and second spacings.

3. An optical scanning apparatus of the type claimed in claim 1 in which the means for moving the scanning elements comprises a mounting frame for said scanning elements, a fixed support, and a pair of cantilever members linked to separated positions on said fixed support and to separated positions on said mounting frame to maintain the alignment of said elements of spacing D parallel to the alignment of said sources or photodetectors of spacing $d$.

4. An optical scanning apparatus of the type claimed in claim 3 in which said cantilever members are shaped and adapted simultaneously to be flexed in the aforesaid direction parallel to the directions of the first and second spacings and to be inflexible in directions perpendicular to the first common surface.

References Cited

UNITED STATES PATENTS

| | | | |
|---|---|---|---|
| 1,695,924 | 12/1928 | Kintner | 178—7.6 |
| 2,006,124 | 6/1935 | Baird. | |

RALPH G. NILSON, Primary Examiner

T. N. GRIGSBY, Assistant Examiner

U.S. Cl. X.R.

178—7